United States Patent [19]

Easterday

[11] Patent Number: 4,731,768
[45] Date of Patent: Mar. 15, 1988

[54] AUTORANGING TIME STAMP CIRCUIT

[75] Inventor: John L. Easterday, Portland, Oreg.

[73] Assignee: Tektronix, Beaverton, Oreg.

[21] Appl. No.: 906,873

[22] Filed: Sep. 15, 1986

[51] Int. Cl.[4] .......................... G04F 8/00; G01R 23/02
[52] U.S. Cl. .................................... 368/118; 324/78 D
[58] Field of Search ........................ 368/113, 118–121; 377/20; 371/20, 21, 24, 25; 324/78 R, 78 D, 79 R, 79 D

[56] References Cited

U.S. PATENT DOCUMENTS

| | | | |
|---|---|---|---|
| 4,031,739 | 6/1977 | Springer | 368/118 |
| 4,107,600 | 8/1978 | McMannis | 368/118 |
| 4,590,602 | 5/1986 | Wolauer | 375/120 |

*Primary Examiner*—Vit W. Miska
*Attorney, Agent, or Firm*—Mark L. Becker; Robert S. Hulse

[57] ABSTRACT

A time stamp circuit comprises a plurality of counter programmable logic arrays for providing a Gray code count. Each count provided by the counters is associated as a time value with a specified event to be stored in memory. The count is generated automatically over a range of progressively slower frequencies provided by frequency dividing circuitry connected to an oscillator. The circuit has two modes of operation, a cumulative mode and a delta mode. In the cumulative mode, the count begins with the first occurrence of a specified event and ends when acquisition is halted. In the delta mode, a control programmable logic array automatically resets the Gray code count and thereby the clock frequency to its highest frequency each time a specified event is stored. The resolution, or time between counts, therefore is the same to begin between each pair of events.

15 Claims, 11 Drawing Figures

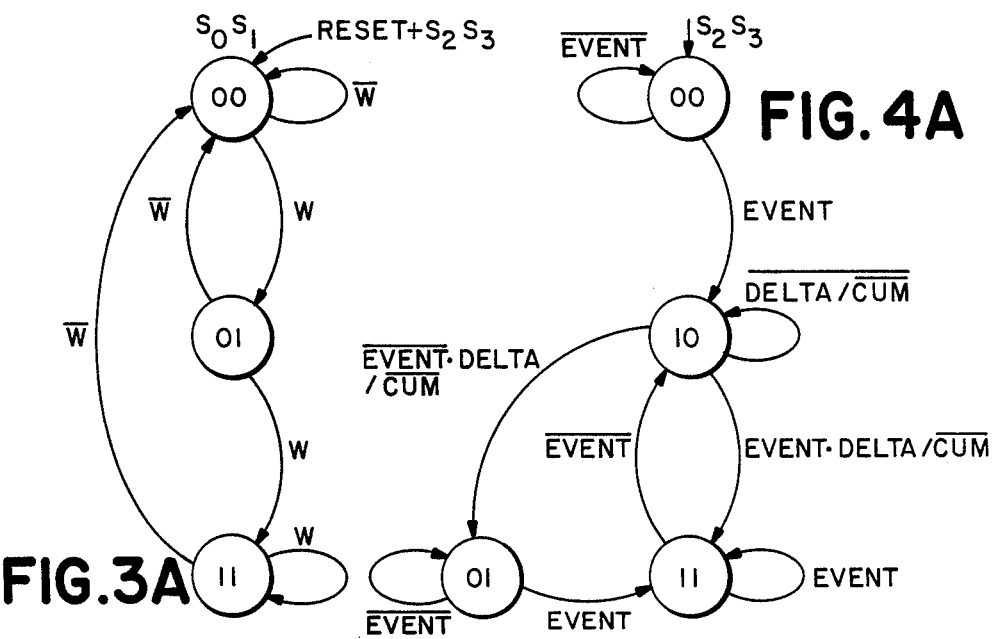

AUTORANGING TIME STAMP CIRCUIT

FIELD OF THE INVENTION

This invention relates generally to data acquisition systems. More particularly, this invention relates to a time measurement circuit within a data acquisition system for measuring the elapsed time between two events stored within the acquisition memory. Such event is one of a number of specified combinations of signals, such as data or instructions generated by logic within a circuit under test.

BACKGROUND OF THE INVENTION

Logic analyzers are commonly used today to analyze the digital signals generated within a circuit. A logic analyzer can perform a number of functions, including acquiring and storing data generated by logic within the circuit under test. One particular use of an analyzer is to monitor the instructions of a microprocessor-based circuit and the data that is generated along therewith to determine if the circuit is operating properly.

In one aspect of its monitoring operation, the analyzer acts as a data acquisition system to acquire and then store data including events in memory. The timing of events is often critical in a circuit, and the data acquisition system typically contains a time measurement circuit for measuring the time between the events. Each event is identified or "stamped" with a unique value representing time as it is acquired, and two time values are then compared to determine the elapsed time.

Conventional data acquisition systems generate these time values with a means such as a counter that produces a cumulative binary code. Each count of the code represents elapsed time. To prevent the counters from "rolling over" too quickly and repeating their values, they are designed to be "autoranging." With autoranging, the counter is clocked over a range of frequencies rather than at a single frequency to enable it to count at progressively slower rates as time progresses. The count is cumulative beginning when the first event is acquired and stored in memory and continuing until acquisition of data is halted.

A drawback of a "stamping" technique that includes autoranging is the progressively poorer resolution (time between counts) that occurs as time progresses. Over a long time, the resolution may become less than an acceptable minimum and even fall below the rate at which events are acquired and stored. For instance, at extremely slow frequencies, successive events may be tagged with the same count. The time between these events cannot be accurately measured.

To improve the accuracy of time measurement, a time stamp should maintain high resolution and yet be autoranging to increase the time over which time measurements can be made.

SUMMARY OF THE INVENTION

An object of the invention, therefore, is to provide an improved time stamp type of time measurement circuit for measuring elapsed time between specified events.

A second object of the invention is to provide such a time measurement circuit with more accurate measurement of the elapsed time between events by improving the resolution for later-stored events.

Another object is to provide such a time measurement circuit with autoranging.

A further object of the invention is to implement the above measurement circuit inexpensively with commercially available logic circuits.

To achieve these objects, a time stamp circuit for associating a time value with a specified event is disclosed. The circuit includes means for generating a plurality of selectable clock frequencies and means for selecting the clock frequencies in decreasing order of frequency to provide a clock signal to a binary code generating means. The binary code generating means produces a binary code count associated as a time value with each specified event. When an event is stored in memory along with its time value, control means then resets the binary count and clock frequency for the binary code generating means. In this way, the higher frequencies are employed at the beginning of the count between each pair of events, thereby maintaining a high resolution for later-stored events.

In the preferred embodiment, the control means and the binary code generating means in the time stamp circuit are programmable logic arrays. A portion of the count of one of the counter programmable logic arrays provides the means for selecting the order of clock frequencies for the clock signal. These frequencies are provided by an oscillator connected to the time stamp circuit, whose base clock frequency is divided by frequency dividing circuitry into the plurality of slower frequencies. As the count changes, the slower frequencies are selected by the count value to extend the time over which the count is provided.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 3A is a state diagram for a portion of a control programmable logic array in the time stamp circuit of FIG. 2.

FIG. 3B is a state table with a state equation for the state diagram of FIG. 3A.

FIG. 4A is a state diagram for a second portion of the control programmable logic array.

FIG. 4B is state table with state equations for the state diagram of FIG. 4A.

FIG. 7 is a state diagram for a second portion of the counter programmable logic array.

DETAILED DESCRIPTION

Functional Overview of the Time Stamp Within a Data Aquisition System

Figure 1:
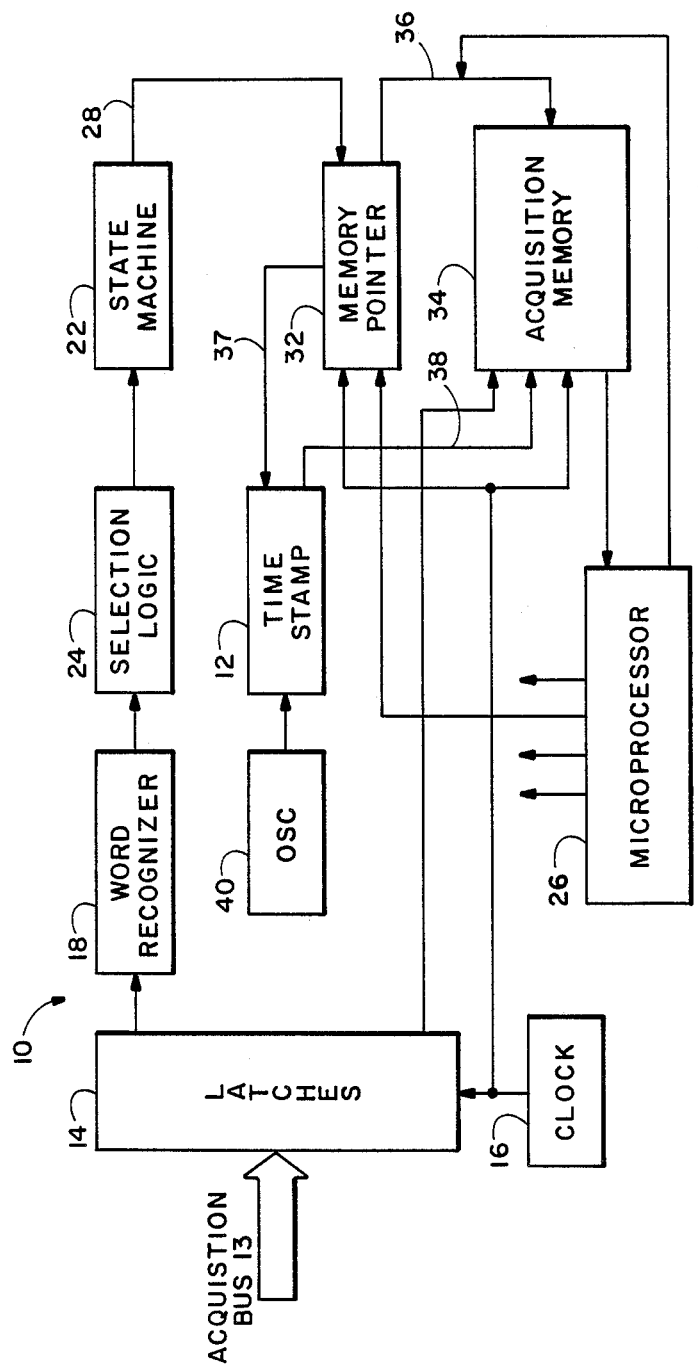
FIG. 1 is a block diagram of a portion of a data acquisition system including a time stamp circuit embodying the invention.

FIG. 1 is a block diagram of a portion of a data acquisition system 10 that includes a "time stamp" type of time measurement circuit 12 embodying the invention. The system 10 itself may contain a number of other elements, but only those elements necessary to understand the function of the time stamp circuit 12 are shown and discussed herein.

Target information from the circuit or device to be analyzed is applied to the input of a latch circuit 14 in system 10 through an acquisition bus 13. The information includes data such as addresses and control signals that comprise specified events of interest. The information is stored or latched by the digital latches in latch circuit 14 because the information is valid on the bus 13 for only a brief period. The latches 14, as well as other elements in the system 10, are clocked by a system clock pulse generator 16.

After being latched, the information is "analyzed" to determine if a specified event or sequence of events has occurred. Word recognizer logic circuit 18 provides combinatorial event recognition of the information and a state machine 22 provides sequential event recognition. The type of event recognition desired is selected by the operator via selection logic 24. These elements are controlled in a conventional manner by a microprocessor 26, with the connections to the elements omitted for clarity. When an event (sequential or combinatorial) is recognized as a specified event, an event signal appears at the output of the state machine 22 on an event bus 28 that routes the signal to a memory pointer 32.

The memory pointer 32 generates memory addresses for an acquisition memory 34 to store in memory the recognized specified events and related data occurring before and after each event. The events and data are routed from the latches 14 on each system clock signal not only to the word recognizer 18 but also directly to the acquisition memory 34. There they are stored at the addresses provided by the memory pointer 32 through an address bus 36. The memory pointer 32 generating these addresses is described in U.S. patent application Ser. No. 899,854, filed Aug. 25, 1986.

The time stamp 12 is notified of the occurrence of a specified event by the memory pointer 32 when generating a memory address via a signal path 37. When a specified event is stored in memory 34, the circuit 12 "stamps" the event with a time value by storing the value with the event in memory. The time value is represented by a binary code count from a binary code such as the reflected or Gray code. The count is stored in memory 34 after it is transmitted via a data bus 38 from the time stamp circuit 12 to memory 34.

The code count is automatically clocked by an oscillator 40 over a range of clock frequencies in a predetermined order, from a higher frequency to progressively slower frequencies. This range of frequencies extends the time over which the count can be generated before it would overflow and roll over. These frequencies may be derived from a 20 megahertz oscillator 40 producing a primary frequency that is connected to the time stamp circuit 12 which divides such frequency to provide the range of frequencies generated independently of the system 10.

Time stamp 12 operates in two modes: a cumulative mode and a delta mode. In the cumulative mode, the binary code count begins when the first event is stored in memory 34 and continues uninterrupted until acquisition of data is halted. As time progresses and events are stored, the frequency of code generation decreases. The resolution for events that are acquired and stored later in time is therefore much poorer than for events that are stored immediately after the system 10 is actuated.

In the delta mode, the binary code count is reset to an initial count along with the clock frequency of the time stamp 12 each time a specified event is stored. The clock frequency therefore slows progressively only between a pair of events, not throughout the time the system 10 is acquiring data. The overall resolution that is maintained is higher than in the cumulative mode. The binary count is also less likely to roll over because it is reset frequently. In this embodiment of the time stamp circuit 12 both the count and clock frequency are reset after each event. The circuit could be designed, however, so that either can be reset alone, the clock frequency to maintain the resolution and the count to prevent a roll over.

In both modes, the count associated with each event is compared by a means such as microprocessor 26 or a host computer to which the data acquisition system is connected to determine the elapsed time between each pair of consecutive events. Time between several events is calculated by adding the separate times between individual event pairs.

Circuit Description

Figure 2:
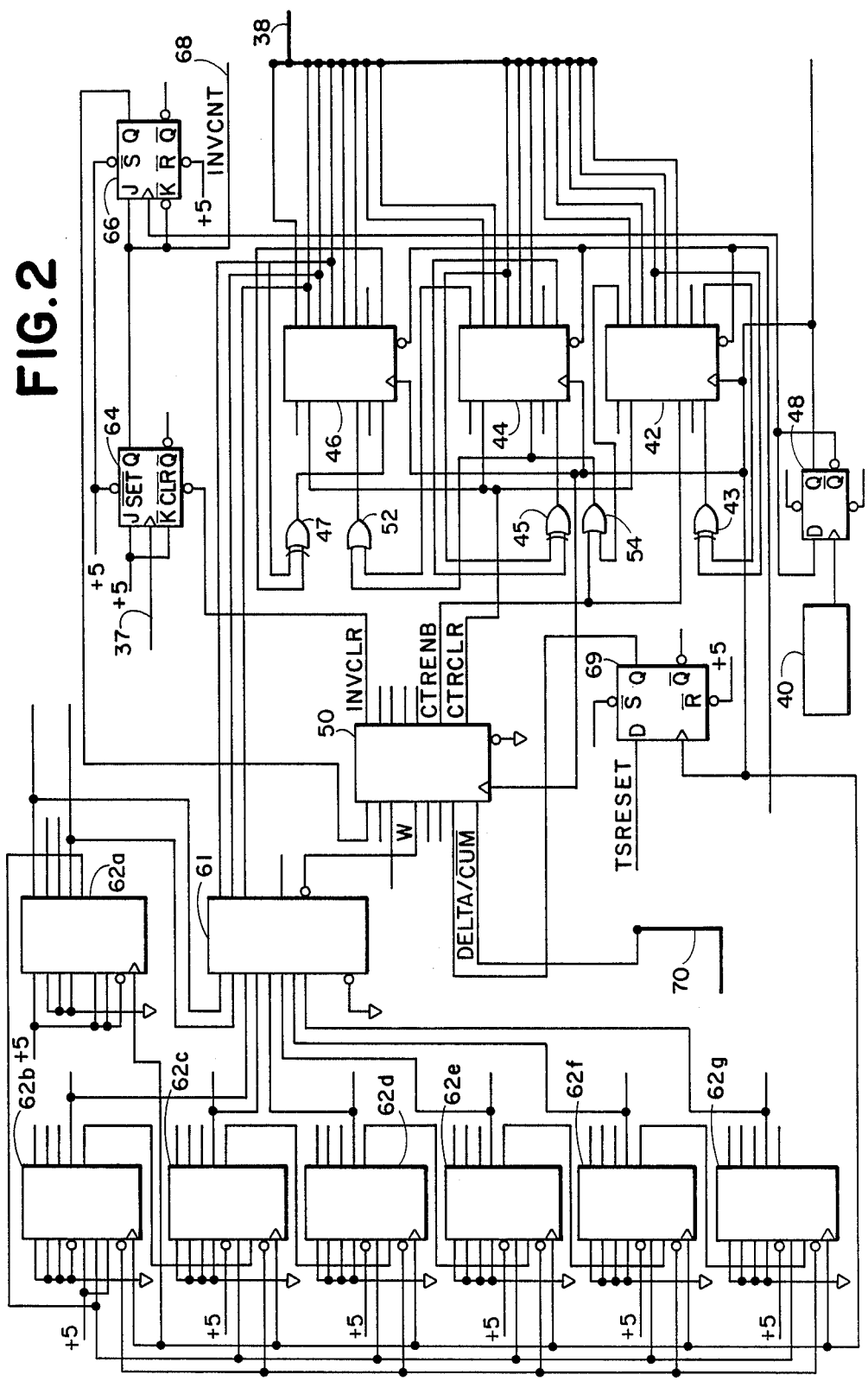
FIG. 2 is a schematic diagram of the time stamp circuit of FIG. 1.

The hardware comprising the time stamp circuit 12 is shown in FIG. 2 and is listed in Table 1 below. This embodiment of the invention, of course, is shown only for purposes of illustration and is not intended to limit the scope of the invention to the hardware employed.

TABLE 1

| Element | Designation |
| --- | --- |
| Counters 62a to g | 74F160 |
| Multiplexer 61 | 74F151 |
| Flip-flops 48, 64, 66 | 74F74, 74F109 |
| OR gates 52, 54 | 74F32 |
| Exclusive OR gates 43, 45, 47 | 74LS86 |
| Programmable logic arrays (PLA) 42, 44, 46, 50 | 16R8 |

Referring to FIG. 2, counter PLAs 42, 44, 46 generate a 15-bit reflected or Gray code count that is routed via data bus 38 to the acquisition memory 34 to be stored with each specified event. The count associates a time value with each event. Gray code is the preferred code because the memory 34 or the event signals from the memory pointer 32 need not be synchronized to the PLAs 42, 44, 46. PLA 42 provides a lower portion of the code count; PLA 44 provides an intermediate portion; and PLA 46 provides an upper portion. The code portions are generated internally as will be described in the method of operation, except for a minterm requiring the feedback of counter signals to PLA circuits 42, 44, and 46 via exclusive OR gates 43, 45, and 47, respectively. The counter PLAs along with other elements in stamp 12 are clocked by the oscillator 40 through a flip-flop 48 that reduces the 20 megahertz signal to a 10 megahertz signal.

The counting rate of the counter PLAs, however, is determined by the frequency at which they are enabled by a control PLA 50. PLA 50 generates a control enable signal CTRENB that is applied to each counter PLA which is combined with an overflow count signal from the immediate lower counter PLA through OR gate 52 or 54 to enable the counter PLAs to count. The PLA 50 in turn generates its CTRENB signal in response to a clock signal W it receives from a frequency selecting means such as a multiplexer 61. Multiplexer 61 selects from a plurality of clock frequencies provided by frequency generating means that comprises counters 62a through 62g. The counters are cascaded together to divide the 10 megahertz signal from flip-flop 48 into seven drstinct frequencies ranging from a 5 megahertz signal produced by counter 62a to a 1 hertz signal produced by counter 62g. The multiplexer 61 selects the clock frequencies in response to the upper portion count of PLA 46, which portion is routed to the select lines of the multiplexer for reading. The multiplexer is configured to select the eight frequencies in decreasing order, in the range from the 5 megahertz signal to the 1 hertz signal, including 5 megahertz, 1 megahertz, 100 kilohertz, 10 kilohertz, 1 kilohertz, 100 hertz, 10 hertz, and 1 hertz as the count portion changes value.

The stamp circuit 12 also includes means for signaling PLA 50 of the occurrence of a specified event. The signaling means comprises the signal path 37 that routes an event signal from memory pointer 32 to PLA 50 via a first flip-flop 64 and a second flip-flop 66. Flip-flop 64 latches the event signal and flip-flop 66 synchronizes the event signal to the 10 megahertz circuit clock. If the circuit 12 is operating in the delta mode, PLA 50 responds to each event signal by resetting the clock frequency to its initial frequency of 5 megahertz. The frequency reset follows from the resetting by PLA 50 of the binary code count to its initial count of zero. This zero count on the select lines of multiplexer 61 causes it to select the initial clock frequency.

The resetting of the counter PLAs and clock frequency takes a minimum amount of time, and it is possible that a second event may occur while PLA 50 is still resetting the counter PLAs after the first event. In such an instance, the count associated with the second event is inaccurate. To warn of an invalid count, circuit 12 includes a means such as an invalid count signal INVCNT for warning of an inaccurate count. This signal is picked off the event signal path 37 between flip-flops 64 and 66 and is sent to memory along line 68. INVCNT is asserted once the event signal appears on line path 37 and remains asserted until flip-flop 64 is cleared by PLA 50 via an INVCLR signal. INVCNT is asserted for approximately 300 nanoseconds after an event signal appears, the time it takes for PLA 50 to sense the event signal and respond with INVCLR to clear flip-flop 64. This is sufficient time for the counter PLAs to reset and begin counting. If the event signal is still present on line path 37 after flip-flop 64 is cleared, INVCNT will again be immediately asserted. This situation may arise where a specified event persists over several system clock cycles.

PLA 50 also receives other input signals of interest. A reset signal TSRESET is received via a flip-flop 69 from microprocessor 26 to reset the circuit 12 on power-up or hardware reset. A mode control signal DELTA/CUM is routed to PLA 50 via a programming bus 70. The logic state of DELTA/CUM determines whether the circuit 12 will operate in the delta or cumulative mode.

When the time between two events is to be determined, means such as microprocessor 26 or a host computer to which the data acquisition system 10 is connected compares the two associated counts and provides the elapsed time.

Method of Operation

The operation of the time stamp 12—the mode, clock frequency, resetting, etc.—is controlled by the PLA 50 in response to the state of its input signals. As primary input signals, the PLA 50 receives the clock signal W from the multiplexer 61 to generate CTRENB (asserted low), the mode control signal DELTA/CUM on bus 70 and the event signal from memory pointer 32. As output signals, PLA generates, in addition to CTRENB, a counter clear signal CTRCLR (asserted low) to clear counters PLAs 42, 44, and 46 after a specified event is stored and INVCLR (asserted low) to flip-flop 64 to clear INVCNT (asserted high). When these signals arise and what they accomplish is best understood in terms of the operation of the two modes.

The Delta Mode

Figure 3C:
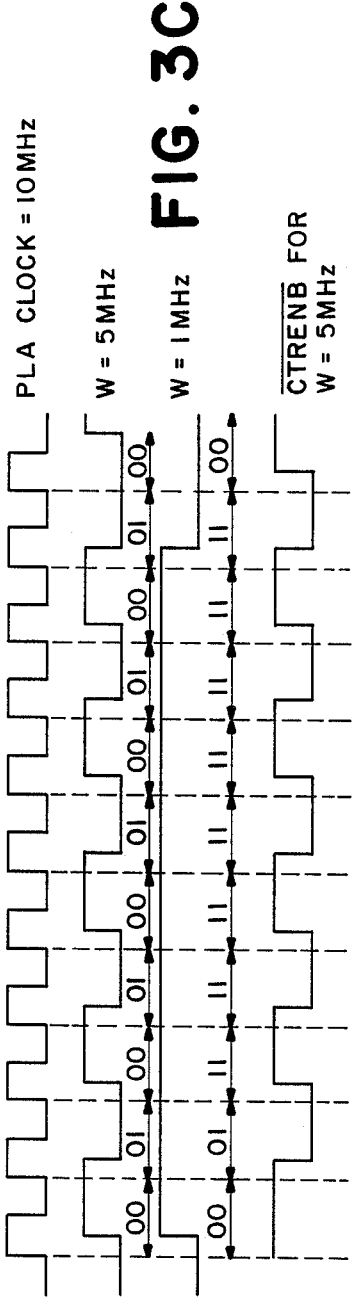
FIG. 3C is a timing diagram for the state diagram of FIG. 3A.

FIGS. 3A, 3B, and 3C are a state diagram, state table and state equation, and timing diagram that explain the generation of CTRENB by PLA 50 in response to the clock signal W. PLA 50 includes internal D type flip-flops that read the clock signal W on the low-to-high transistion of the 10 megahertz PLA clock. At power-up or counter reset after an event, internal PLA signals $S_0$, $S_1$ that generate CTRENB are in state 00 awaiting the arrival of an input clock signal W from the multiplexer 61. W will be at its highest frequency, 5 megahertz. Once a clock signal is received, signals $S_0$, $S_1$ move to state 01 and CTRENB is thereby asserted (here active low) to cause PLAs 42, 44, 46 to count. In the case of PLAs 44 and 46, CTRENB is ORed at gates 52, 54 with the carry signal CEOUT1 and CEOUT2, respectively, (also active low) from the preceding PLAs. Recall that the clock W signal has a frequency selected from one of the seven slower frequencies available, initially the 5 megahertz frequency. The W signal therefore persists after CTRENB disappears, as indicated in FIGS. 3A, 3C, moving $S_0$, $S_1$ to state 11. $S_0$, $S_1$ remain in that state until W disappears, at which time they return to state 00. Signals $S_0$, $S_1$ return directly to state 00 from state 01; however, when W is a 5 megahertz signal, CTRENB is not again asserted until a new W clock signal then arrives.

Figure 4C:
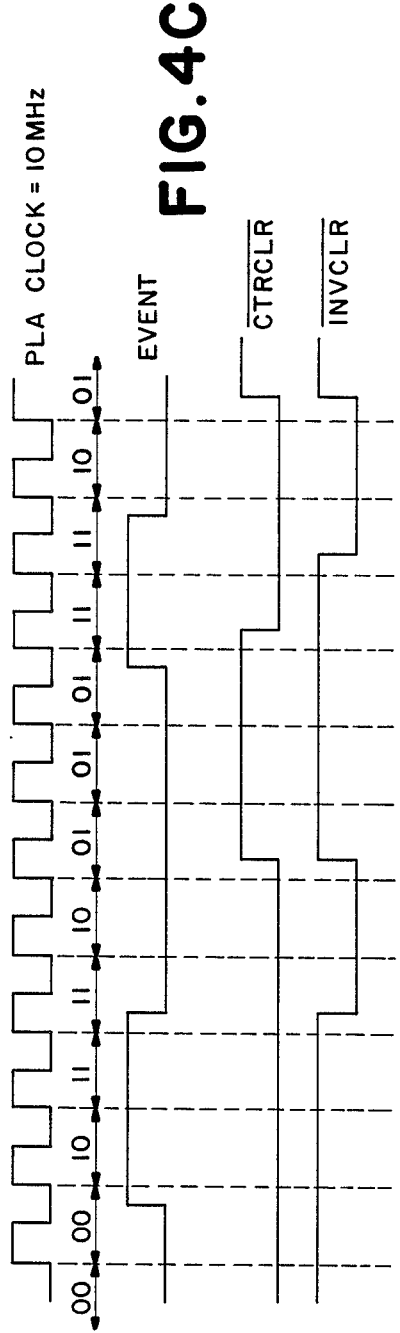
FIG. 4C is a timing diagram for the state diagram of FIG. 4A.

FIGS. 4A, 4B, and 4C are a state diagram, state table and state equations, and timing diagram that explain the generation of INVCLR and CTRCLR by PLA 50 in response to the event signal and the mode signal. On power-up, internal signals $S_2$, $S_3$ that generate CTRCLR and INVCLR are reset to state 00. In state 00, CTRCLR is asserted to reset the counter PLAs to zero. When a specified event occurs, $S_2$, $S_3$ move from state 00 to state 10 but continue to assert CTRCLR through this PLA clock cycle. The event persists beyond the 10 megahertz PLA clock cycle as shown in FIG. 4C and $S_2$, $S_3$ move to state 11, CTRCLR still being asserted. $S_2$, $S_3$ remain in state 11 until the event signal disappears at the input of PLA 50. Once the event signal disappears, $S_2$, $S_3$ return to state 10, CTRCLR still being asserted. $S_2$, $S_3$ then move to state 01 and CTRCLR disappears, allowing the counter PLAs to count until another event occurs. From there $S_2$, $S_3$ move to state 11, to state 10 and back to 01 until data acquisition is halted or a reset occurs.

INVCLR is asserted once $S_2$, $S_3$ are in state 11, one PLA 10 megahertz clock cycle after CTRCLR is asserted in transition from state 10 to 11 or 01 to 11. This delay provides the counter PLAs with time to clear and begin counting. The INVCLR signal clears flip-flop 64 and thereby changes the logic state of the INVCNT signal to memory 34. INVCLR remains asserted until $S_2$, $S_3$ move to state 10 after the event signal diappears.

Figure 5:
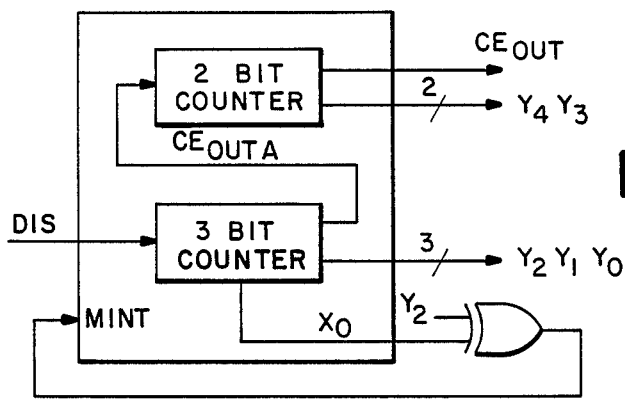
FIG. 5 is a block diagram of a counter programmable logic array for the time stamp circuit of FIG. 2.

FIGS. 2 and 5 illustrate the configuring of a PLA 42, 44, and 46 to enable each to generate the Gray code count. The logic equations that show how each counter PLA counts are given below, where DIS, the enable input to the PLA, is active low:

PLA 42

$$DIS = \overline{CTRENB} \quad (1)$$

PLA 44

$$DIS = \overline{CTRENB} + \overline{CEOUT1} = \overline{CTRENB \cdot CEOUT1} \quad (2)$$

PLA 46

$$DIS = \overline{CTRENB \cdot CEOUT1} + \overline{CEOUT2} = \overline{CTRENB \cdot CEOUT1 \cdot CEOUT2} \quad (3)$$

CEOUT1 is the external carry from PLA 42 to OR gate 54. CEOUT2 is the external carry from PLA 44 to OR gate 52.

Figure 6:
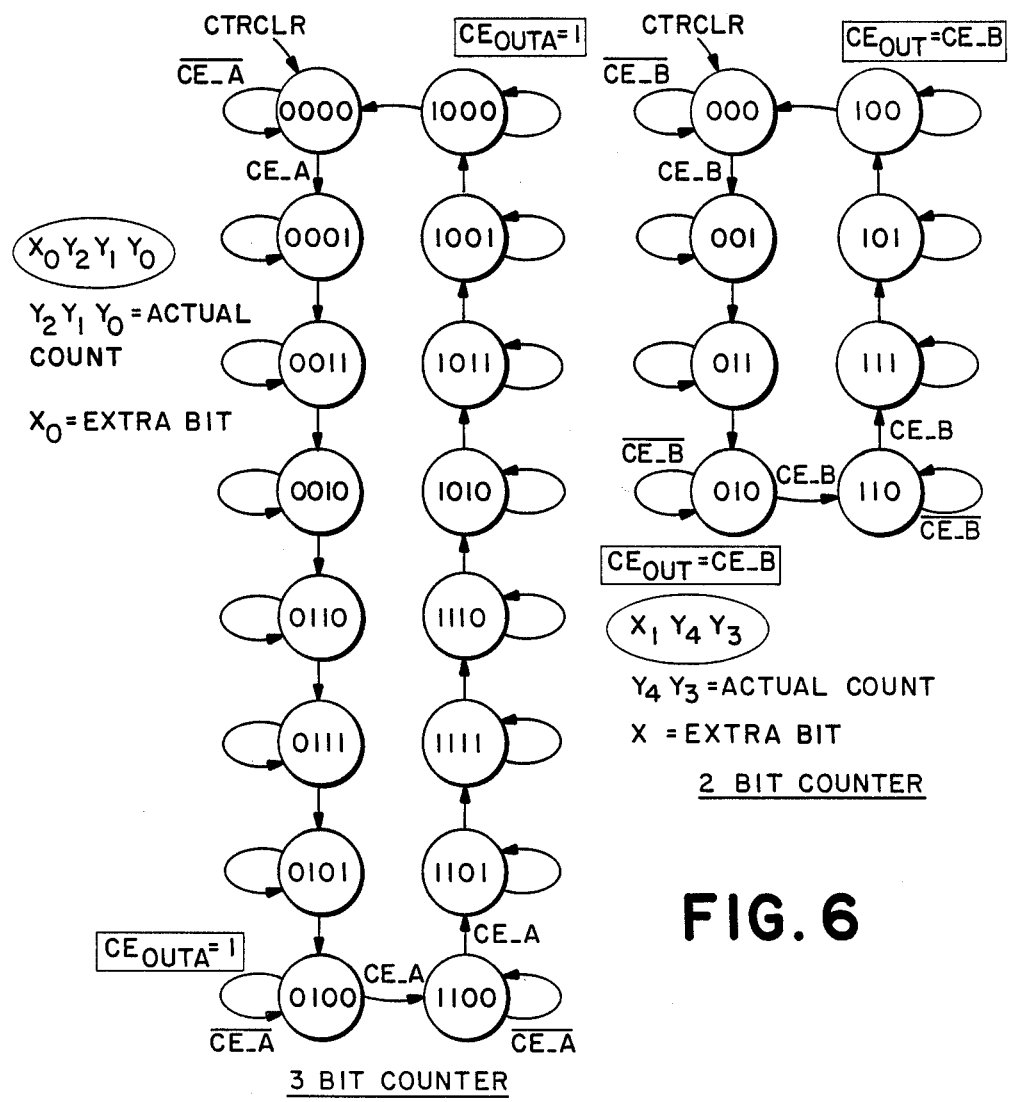
FIG. 6 is a state diagram for a portion of the counter programmable logic array.

FIGS. 6 and 7 illustrate the count generation of PLA 42, which is the same for PLAs 44 and 46 except for designation of the carry signals. As shown in the state diagrams, PLA 42 initially generates a count of 0000 in a 3-bit counter, the three lower bits being the counter output and the upper bit being a status bit. Each time CTRENB is asserted, the PLA moves to another state. On transition from state 0100 to 1100, the PLA asserts CEOUTA (an internal carry) simultaneously with the assertion of CTRENB. CEOUTA and CTRENB cause the internal 2-bit counter (again with a status bit) shown in FIG. 7 to move from one state to another, such as from state 000 to 001. Note that the three counter output bits of the 3-bit counter do not change during this transition. Only one counter bit in the 2-bit counter changes. CEOUTA is again asserted in the state change of the 3-bit counter from 1000 to 0000. This process continues until the 2-bit counter generates CEOUT1 (the external carry to PLA 44) during the transition of the 2-bit counter from state 010 to 110 and from 100 to 000. During these two transitions, none of the output bits of the 2-bit counter or the 3-bit counter change, the transition occurring instead in a following counter PLA. For example, CEOUT1 is ORed with CTRENB to cause PLA 44 to count according to logic equation (2). This process continues with PLAs 44 and 46 as shown in logic equation (3) to generate the entire 15-bit Gray code count.

The frequency at which W is generated is determined by the count of the upper three bits of the Gray code count produced by PLA 46, which are routed to the select lines of multiplexer 61. As these bits change, the slower frequencies are selected, thereby extending the time range of the circuit 12. PLA 46 also generates an overflow bit if the count reaches its maximum.

The Cumulative Mode

In the cumulative mode, the binary code count is not reset after a specified event is stored but continues until acquisition is halted. The clock signal therefore is switched to progressively slower frequencies throughout the data acquisition. This difference from the delta mode appears in FIG. 4A, where internal signals $S_2$, $S_3$ remain in state 10 indefinitely. CTRCLR is therefore only asserted on reset and disappears upon the occurrence of the initial event. INVCLR is never asserted. The operation of the circuit 12 otherwise is the same as in the delta mode.

Having illustrated and described the principles of the invention in a preferred embodiment, it should be apparent to those skilled in the art that the invention can be modified in arrangement and detail without departing from such principles. For example, the circuit 12 could be implemented with conventional counters rather than PLAs, with other configurations of PLAs, or be produced as an integrated circuit. I therefore claim all modifications coming within the spirit and scope of the following claims.

I claim:

1. A circuit for associating time values with specified events stored in a memory, comprising:
    means for generating a plurality of different known clock frequencies;
    means for selecting in order of decreasing frequency the clock frequencies to provide a clock signal;
    means for generating in response to the clock signal a binary code count to be associated as a time value with each specified event to be stored;
    means for signaling the occurrence of a specified event; and
    control means responsive to the signaling means to reset the clock frequency to its initial frequency in the predetermined order each time a specified event occurs.

2. The circuit of claim 1 in which a portion of the binary code count is fed back to the frequency selecting means to select the clock frequencies in the predetermined order.

3. The circuit of claim 2 in which the control means resets the binary code count in response to the signaling of a specified event, the portion of the reset count fed back to the frequency selecting means thereby selecting the initial frequency.

4. The circuit of claim 1 including means for comparing the binary code counts associated with at least two specified events to determine the time elapsed between the events.

5. The circuit of claim 1 in which the clock frequency generating means includes an oscillator providing a clock signal of a predetermined clock frequency to a plurality of counters connected in cascade, the counters dividing the predetermined frequency to generate the plurality of clock frequencies.

6. A circuit for associating time values with specified events stored in a memory, comprising:
    means for generating a plurality of different known clock frequencies;
    a multiplexer for selecting in order of decreasing frequency the clock frequencies to provide a clock signal;
    means for generating in response to the clock signal a binary code count to be associated as a time value with each specified event to be stored;
    means for signaling the occurrence of a specified event; and
    control means responsive to the signaling means to reset the clock frequency to its initial frequency in the predetermined order each time a specified event occurs.

7. The circuit of claim 1 in which the binary code is a reflected code.

8. The circuit of claim 1 in which the clock frequencies range from one hertz to five megahertz.

9. The circuit of claim 1 in which the binary code generating means comprises a plurality of programmable logic arrays and the control means comprises a programmable logic array, the control programmable logic array enabling the counter programmable logic arrays to count simultaneously in generating the binary code count.

10. The circuit of claim 1 including means for warning that two specified events have occurred too close in time to generate binary code counts that validly reflect the time therebetween.

11. In a data acquisition system that stores specified events in memory, a circuit for associating a time value with each specified event that is stored for measuring the time between the events, the circuit comprising:
an oscillator providing a clock frequency;
a plurality of counters clocked by the oscillator and connected in cascade to divide the oscillator frequency, each counter generating a clock signal of predetermined frequency, the frequencies having a decreasing order;
a plurality of counter programmable logic arrays for generating a Gray code count, the count generated in response to a clock signal provided by one of the predetermined frequencies;
a multiplexer for selecting in response to a portion of the Gray code count the clock frequencies in the decreasing order to provide the clock signal to the counter programmable logic arrays; and
a control programmable logic array for sensing the occurrence of a specified event and in response resetting the Gray code count to an initial count and through the reset of the count resetting the clock frequency to its initial frequency in the predetermined order.

12. A method of associating a time value with specified events, the events stored in memory, comprising:
generating a clock signal from a range of clock frequencies;
generating in response to the clock signal a binary code count to be associated as a time value with each specified event;
selecting progressively slower clock frequencies as the code count changes;
signaling the occurrence of a specified event;
storing the binary code count associated with each specified event; and
resetting the clock frequency to its initial clock frequency each time a specified event occurs.

13. The method of claim 12 including reading the binary code count to select the clock frequency providing the clock signal and resetting the binary code count each time a specified event occurs to reset the clock frequency.

14. The method of claim 12 including warning that two specified events have occurred too close in time to generate binary output counts that validly reflect the time therebetween.

15. The method of claim 12 including comparing the binary code count of two events to determine the elapsed time between the events.

* * * * *